United States Patent [19]
Li

[11] Patent Number: 5,309,562
[45] Date of Patent: May 3, 1994

[54] METHOD AND APPARATUS FOR ESTABLISHING PROTOCOL SPOOFING FROM A MODEM

[75] Inventor: Ping Li, New Brighton, Minn.

[73] Assignee: Multi-Tech Systems, Inc., Mounds View, Minn.

[21] Appl. No.: 746,875

[22] Filed: Aug. 19, 1991

[51] Int. Cl.$^5$ ............... G06F 13/42; G06F 13/14; H04L 7/00

[52] U.S. Cl. ............... 395/200; 395/325; 395/500; 370/94.1; 364/DIG. 1; 364/240.9; 364/DIG. 2; 364/940.81; 375/8

[58] Field of Search ............ 370/94.1; 395/325, 500, 395/200; 375/8

[56] References Cited

U.S. PATENT DOCUMENTS

| | | | |
|---|---|---|---|
| 4,680,773 | 5/1987 | Amundson | 375/8 |
| 4,680,781 | 5/1987 | Amundsen et al. | 395/325 |
| 4,691,314 | 9/1987 | Bergins et al. | 370/94.1 |
| 4,736,369 | 4/1988 | Barzilai et al. | 370/94.1 |
| 4,995,056 | 2/1991 | Fogg, Jr. et al. | 370/94.1 |
| 5,168,479 | 12/1992 | Ozaki et al. | 370/94.1 |

OTHER PUBLICATIONS

Microcom Systems, "QX/4232hs Error-Correcting Modem Reference Manual", 1990, p. 82.

Telebit Inc., "T2500 Reference Manual", 1990, pp. 5-13.

Byrd, Mike, "Breaking The Speed Barrier", Dec. 11, 1990, PC Magazine, reprint.

Strom, Charles H. "Testing Three High-Speed Modems", Micro/Systems Journal vol. 4, No. 11 Nov. 1988 pp. 44-48.

*Primary Examiner*—Robert B. Harrell
*Assistant Examiner*—Timothy L. Philipp
*Attorney, Agent, or Firm*—Schwegman, Lundberg & Woessner

[57] ABSTRACT

A method for establishing a spoofing service for a high-level file transfer protocol from a modem. A modem spoofing initiation protocol (MSIP) word containing modem limitations is appended to the initial negotiation frame sent by the host to the receiver. If the receiving modem detects the MSIP word at the end of the negotiation frame, it compares its own limits with the received limits, takes the lower limit as the agreement, then appends the agreement word to the frame sent to acknowledge the negotiation frame. If the sending modem detects the agreement word, both modems use the agreed limits to examine the maximum block size and window size in the negotiation frame of the high-level file transfer protocol. If the block size and window size are within the agreed values, the spoofing service begins.

13 Claims, 2 Drawing Sheets

METHOD AND APPARATUS FOR ESTABLISHING PROTOCOL SPOOFING FROM A MODEM

BACKGROUND OF THE INVENTION

1. Field of the Invention

The present invention pertains generally to data communications devices, and more particularly to a method for establishing a spoofing service for a high-level file transfer protocol from a modem.

2. Background of the Invention

The need to transfer information over voice-grade telephone lines via modems has prompted the development of various high-level file transfer protocols such as UUCP, Kermit, and XMODEM. High-level protocols are necessary because they provide a way to accurately send data across noisy lines without data loss or corruption. Most protocols divide the data to be sent into fixed length portions called packets or frames and calculate a cyclical redundancy check (CRC) for each frame to provide a way to detect transmission errors. For stop-and-wait and sliding-window protocols the sender transmits a given number of frames and then waits for an acknowledgement from the receiver that all frames were received intact and transmission may continue. The acknowledgement provides a way for the sender to stay in synchronization with the receiver and retransmit lost or corrupted frames if needed.

Over time, modems have evolved from simple modulators/demodulators transmitting at 300 baud to intelligent data processors capable of significantly higher data transfer rates through sophisticated data compression and line modulation methods. Because of these increased processing capabilities, modern modems can now provide an error correcting data link at the modem level by using such data transfer protocols as Microcom Networking Protocol (MNP) and LAP-M. The ability for modems to provide an error correcting data link provides error-free communication for transmissions where no high-level protocols are in use.

However, the use of stop-and-wait protocols at the host level introduces significant delays into the data transfer process. Even with sliding-window protocols, if the round trip transit time between the sender and receiver is relatively long and the data frame size is relatively small, a significant portion of the overall data transfer time may be spent with the sender blocked waiting for acknowledgements. This problem is compounded by the use of error correcting data transfer protocols at the modem level. Since the receiving modem waits until its data frame is full before calculating the CRC and sending it to the receiving host, an additional delay is introduced between the time data is sent by the sending host and the time the receiving host sends the acknowledgement.

One solution to this problem is for the sending modem to automatically provide the acknowledgement to the host when the host expects it even though the receiver has not actually received the data yet. The receiving modem in turn suppresses any acknowledgements sent by the receiver as the acknowledgements have already been provided by the sending modem. This spoofing service allows the sending host to continuously transmit data and eliminates the round trip transit time delay of the acknowledgements from the receiving host.

In order to establish a spoofing service the sending modem must work in coordination with the receiving modem. Existing spoofing services depend on coordinating the sending and receiving modems through underlying modem data transfer protocols that support spoofing. However, if both modems do not support the same data transfer protocol, or support a protocol that does not provide for spoofing, they will not be able to provide a spoofing service to the host.

Therefore, there is a need to provide a method for a spoofing service that does not depend on the underlying modem data transfer protocol.

SUMMARY OF THE INVENTION

The present invention provides a method for establishing a spoofing service for a high-level file transfer protocol from a modem. A modem spoofing initiation protocol (MSIP) word containing modem limitations is appended to the initial negotiation frame sent by the host to the receiver. If the receiving modem detects the MSIP word at the end of the negotiation frame, it compares its own limits with the received limits, takes the lower limit as the agreement, then appends the agreement word to the frame sent to acknowledge the negotiation frame. If the sending modem detects the agreement word, both modems use the agreed limits to examine the maximum block size and window size in the negotiation frame of the high-level file transfer protocol. If the block size and window size are within the agreed values, the spoofing service begins.

The method for establishing a high-level protocol spoofing service requires only slightly additional memory to store the modem limitations and requires slightly more program code to implement. A system implemented according to the present invention does not depend on the underlying modem data transfer protocol and demonstrates a noticeable increase in the speed with which data can be transmitted using high-level file transfer protocols than systems not implementing a spoofing service.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
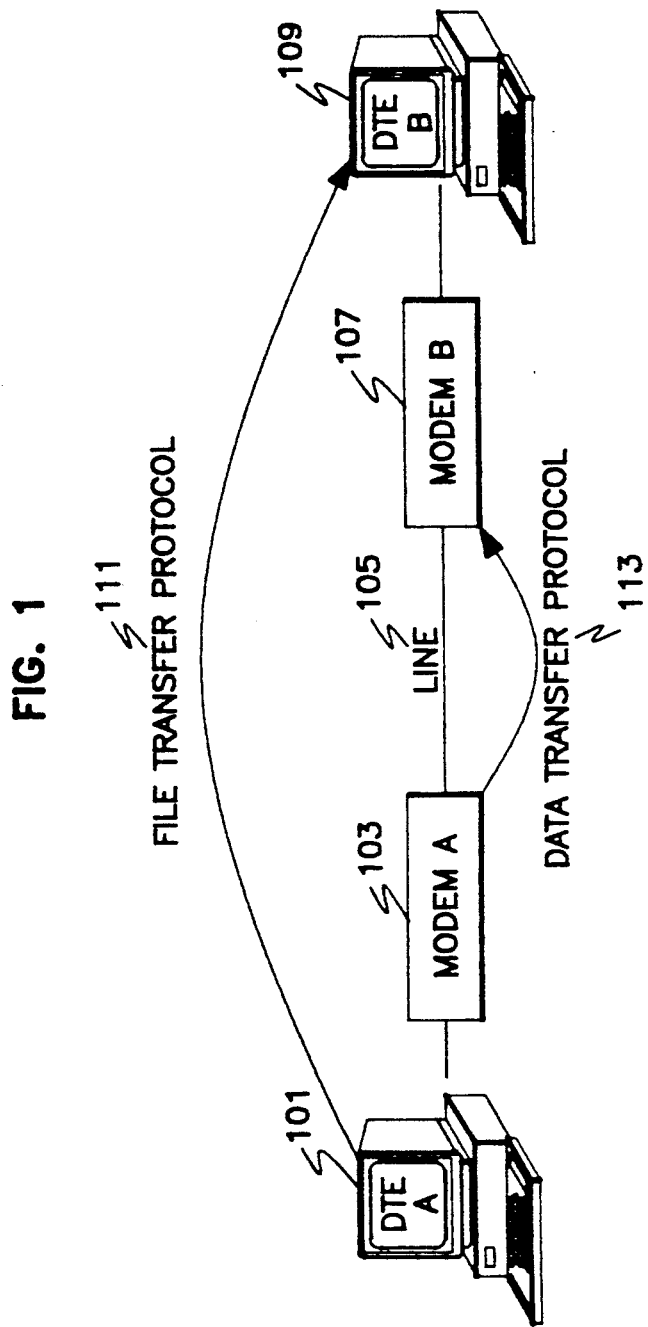
FIG. 1 is a diagram showing the connection between two Data Terminal Equipment (DTE) devices via modems according to the present invention.

As illustrated in FIG. 1, digital information is sent from DTE A 101 to Modem A 103. Modem A 103 converts the digital signals to analog signals, and sends them to Modem B 107 over line 105. Modem B 107 converts the analog signals to digital signals and sends them to DTE B 109. DTE A 101 and DTE B 109 logically communicate through a high-level file transfer protocol 111, and Modem A 103 and Modem B 107 logically communicate through a high-level data transfer protocol 113.

The Modem Spoofing Initiation Protocol (MSIP) initial word consists of two bytes:

| Byte 1 | Byte 2 |
|---|---|
| 01001101 | xxxxyyyy | where byte 1 is an ASCII uppercase letter 'M' and where byte 2 is the window size xxxx given in Table 1 below and block size yyyy given in Table 2 below.

TABLE 1

| xxxx | Window Size | xxxx | Window Size |
|---|---|---|---|
| 0000 | 1 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 |

TABLE 2

| yyyy | Block Size |
|---|---|
| 0000 | 32 |
| 0001 | 64 |
| 0010 | 128 |
| 0011 | 256 |
| 0100 | 512 |
| 0101 | 1024 |
| 0110 | 2048 |
| 0111 | 4096 |

Figure 2:
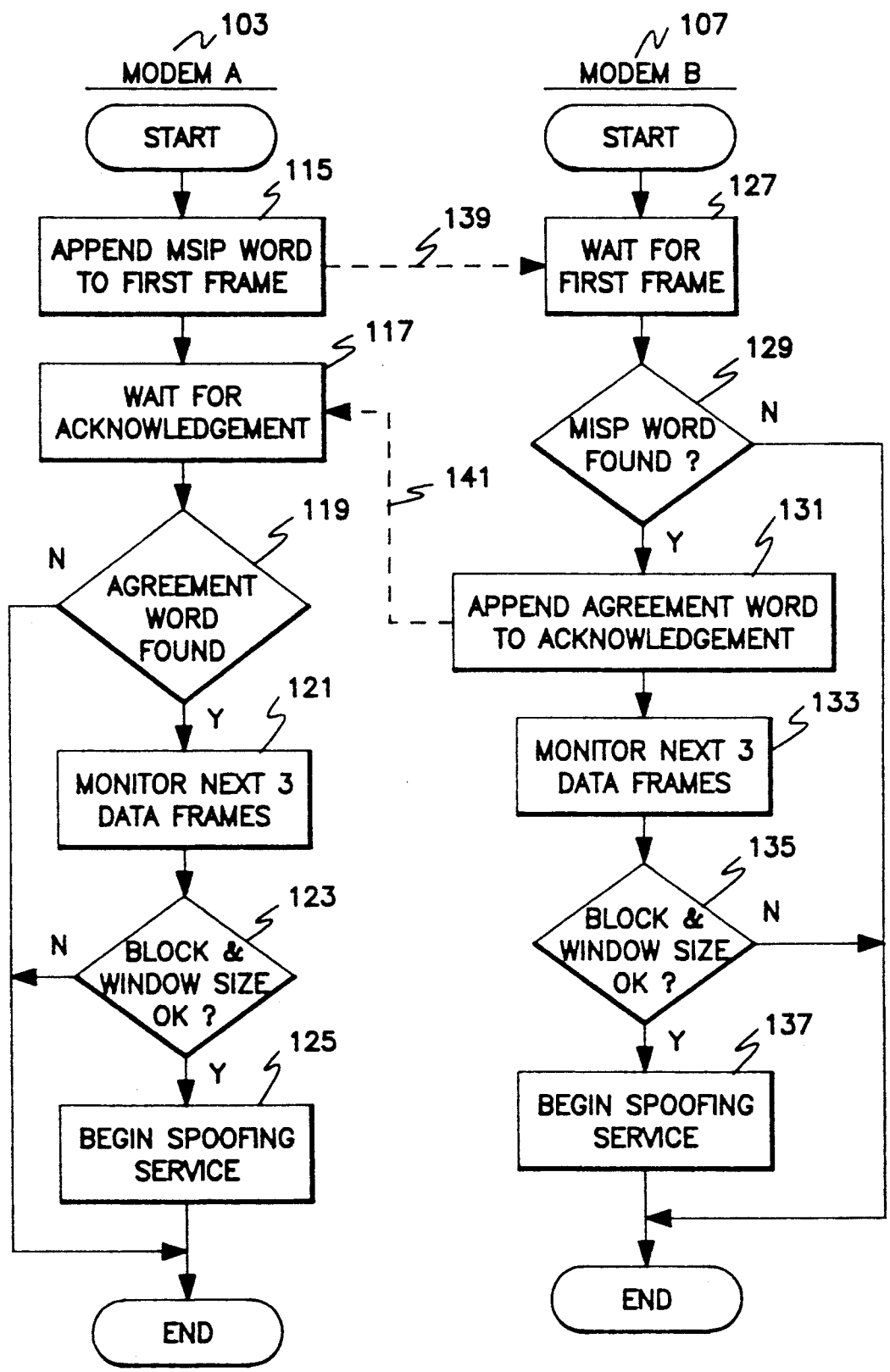
FIG. 2 is a flow diagram showing the steps taken to establish a spoofing service according to the present invention.

The method for establishing a spoofing service is shown in FIG. 2. At 115 the MSIP word is appended by the sending modem 103 to the first data frame which is then sent at 139 to the receiving modem 107. The sending modem 103 waits at 117 for an acknowledgement. At 127 the receiving modem 107 waits for the first data frame and checks at 129 to see if the MISP word is included. If the MSIP word is included, an agreement word is appended to the acknowledgement frame at 131, sent at 141 to the sending modem 103, and the next three incoming data frames are monitored at 133 for their block and window size. At 119 the sending modem 103 checks for the agreement word. If the agreement word is included, the next three outgoing data frames are monitored at 121 for their block and window size. The block and window size is checked at 123 to see if they fall within the agreed limits. If so, spoofing service begins at 125. The receiving modem 107 checks the block and window size at 135. If they fall within the agreed limits, spoofing service begins at 137.

As described above, the method for establishing a spoofing service for a high-level file transfer protocol from a modem does not depend on the underlying data transfer protocol. Modem limitation information is appended to data frames regardless of the attributes or contents of the frames. If the sending and receiving modems successfully communicate their abilities to each other via the MSIP word, they simultaneously and independently determine whether spoofing is possible by examining the attributes of the next three data frames as they are transmitted and received. If the data frame attributes fall within the agreed limits by both modems, each modem begins the spoofing service, otherwise, normal transmission of data is resumed.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. In a modem for transmitting data between a host computer and a receiving computer over a communication line, the host computer and receiving computer communicating through a high level data transfer protocol wherein data is sent in portions and the host computer waits for an acknowledgement from the receiving computer after each portion is sent before sending another portion, the high level protocol further including the host computer and receiving computer engaging in a negotiation prior to a data transfer operation, the negotiation including the transfer of an initial negotiation frame to the receiving computer, the receiving computer responding to the initial negotiation frame with an initial acknowledgement frame, and the host and receiving computers thereafter exchanging one or more frames of information regarding respective data transfer capabilities, the modem having a spoofing service wherein the spoofing service provides that when the modem receives a portion of data from a host computer over the communication line to be supplied to a receiving computer, the modem automatically provides a high level protocol acknowledgement to the host computer even though the receiving computer has not actually received all of the portion of data yet from the modem, the spoofing service also suppressing the high level protocol acknowledgement sent by the receiving computer to prevent the host computer from receiving two acknowledgements for the same data portion, a spoofing service initiation system, comprising:

first means for detecting an initial negotiation frame received by the modem from a host computer to be applied to the communication line, and in response to the detection of the initial negotiation frame;

(a) appending a modem spoofing initiation protocol (MSIP) word to the initial negotiation frame, the MSIP word signalling that the modem can support the spoofing service and containing information on data transfer modes supported by the modem for the spoofing service; and (b) detecting an initial acknowledgement frame received from a communication line to be supplied to a host computer, and monitoring the detected initial acknowledgement frame for an agreement word, and, if the word is present (i) determining a mutually supported data transfer mode from the agreement word, and (ii) monitoring subsequent high level protocol negotiation data exchanged by the receiving computer and the host computer, the high level negotiation data specifying a high level data transfer protocol, and if the high level data transfer protocol is compatible with the mutually supported data transfer mode, establishing the spoofing service;

second means for detecting an initial negotiation frame received from the communication line to be supplied to a receiving computer, and monitoring a detected initial negotiation frame for the presence of an appended MSIP word, the second means including means responsive to the presence of an appended MSIP word and the detection of an initial acknowledgement frame sent by the receiving computer connected to the modem for (a) appending an agreement word to the initial acknowledgement frame, the agreement word signalling that the modem can support the spoofing service and specifying a data transfer mode for the modem compatible with a data transfer mode specified in the MSIP word, to establish the mutually supported data transfer mode, and (b) monitoring subsequent high level protocol negotiation data exchanged by the receiving computer and the host computer, the high level negotiation data specifying a high level data transfer protocol, and if the high level data transfer protocol is compatible with the mutually supported data transfer mode, establishing the spoofing service.

2. Apparatus according to claim 1 wherein the data transfer mode specified in the MSIP word specifies a window size and a block size for a data transfer operation.

3. Apparatus according to claim 2 wherein the high level data transfer protocol specifies a window size and a block size for a data transfer operation.

4. In a modem for transmitting data between a host computer and a receiving computer over a communication line, the host computer and receiving computer communicating through a high level data transfer protocol wherein data is sent in portions and the host computer waits for an acknowledgement from the receiving computer after each portion is sent before sending another portion, the high level protocol further including the host computer and receiving computer engaging in a two-way communication prior to a data transfer operation to determine the high level data transfer protocol to be used, the two-way communication including the transfer of one or more data frames between the host and the receiving computers, the modem having a spoofing service wherein the spoofing service provides that when the modem receives a portion of data from a host computer over the communication line to be supplied to a receiving computer, the modem automatically provides a high level protocol acknowledgement to the host computer even though the receiving computer has not actually received all of the portion of the data yet from the modem, the spoofing service also suppressing the high level protocol acknowledgement sent by the receiving computer to prevent the host computer from receiving two acknowledgements for the same data portion, a spoofing service initiation system, comprising:

first means for detecting one or more data frames received by the modem from a host computer to be applied to the communication line, and in response to the detection of the one or more data frames, (a) appending a modem spoofing word to one or more of the data frames, the one or more data frames comprising part of a two-way communication in a high level protocol between the host computer and a receiving computer prior to a data transfer operation, the modem spoofing word signalling that the modem can support the spoofing service, and (b) monitoring one or more of the data frames sent by a receiving computer back to the host computer during the two-way communication, the data frames monitored for the presence of an agreement word, and if the word is present establishing the spoofing service; and second means for detecting one or more of the data frames received from the communication line to be supplied to a receiving computer during the two-way communication, and in response to the detection of the one or more data frames monitoring the one or more data frames for the presence of an appended modem spoofing word, and if the word is present appending an agreement word to one or more subsequent data frames sent by the receiving computer back to the host computer during the two-way communication, and establishing spoofing service, the agreement word signalling that the modem can support the spoofing service.

5. Apparatus according to claim 4 wherein the modem spoofing word further specifies data transfer capabilities of the modem.

6. Apparatus according to claim 5 further wherein the data transfer capabilities are specified as a window size and a block size for a data transfer operation.

7. Apparatus according to claim 6 wherein the high level data transfer protocol specifies a window size and a block size for a data transfer operation, and further including means for monitoring the exchange of data frames during the negotiation to determine the compatibility of the modem spoofing service with the high level protocol.

8. Apparatus according to claim 4 further including means for monitoring data exchanged by the host and receiving computers during the negotiation to determine if the spoofing service can be initiated.

9. In a modem for transmitting data between a host computer and a receiving computer over a communication line, the host computer and receiving computer communicating through a high level data transfer protocol wherein data is sent in portion and the host computer waits for an acknowledgement from the receiving computer after each portion is sent before sending another portion, the high level protocol further including the host computer and receiving computer engaging in a two-way communication prior to a data transfer operation to determine the high level data transfer protocol to be used, the two-way communication including the transfer of one or more data frames between the host and the receiving computers, the modem having a spoofing service wherein the spoofing service provides that when the modem receives a portion of data from a host computer over the communication line to be supplied to a receiving computer, the modem automatically provides a high level protocol acknowledgement to the host computer even though the receiving computer has not actually received all of the portion of data yet from the modem, the spoofing service also suppressing the high level protocol acknowledgement sent by the receiving computer to prevent the host computer from receiving two acknowledgements for the same data portion, a spoofing service initiation method, comprising the steps of:

the modem detecting one or more data frames received by the modem from a host computer to be applied to the communication line, and in response to the detection of the one or more data frames, (a) appending a modem spoofing word to one or more of the data frames, the one or more data frames comprising part of a two-way communication in a high level protocol between the host computer and a receiving computer prior to a data transfer operation, the modem spoofing word signalling that the modem can support the spoofing service; and (b) monitoring one or more of the data frames sent by a receiving computer back to the host computer during the two-way communication, the data frames monitored for the presence of an agreement word, and if the word is present establishing the spoofing service; and the modem detecting one or more of the data frames received from the communication line to be supplied to a receiving computer during the two-way communication, and in response to the detection of the one or more data frames monitoring the one or more data frames for the presence of an appended modem spoofing word, and if the word is present appending an agreement word to one or more subsequent data frames sent by the receiving computer back to the host computer during the two-way communication, and establishing spoofing service, the agreement word signalling that the modem can support the spoofing service.

10. A method according to claim 9 wherein the modem spoofing word further specifies data transfer capabilities of the modem.

11. A method according to claim 10 further wherein the data transfer capabilities are specified as a window size and a block size for a data transfer operation.

12. A method according to claim 10 wherein the high level data transfer protocol specifies a window size and a block size for a data transfer operation, and further including means for monitoring the exchange of data frames during the negotiation to determine the compatibility of the modem spoofing service with the high level protocol.

13. A method according to claim 12 further including the step of monitoring data exchanged by the host and receiving computers during the negotiation to determine if the spoofing service can be initiated.

* * * * *

UNITED STATES PATENT AND TRADEMARK OFFICE
CERTIFICATE OF CORRECTION

PATENT NO. : 5,309,562
DATED : May 3, 1994
INVENTOR(S) : Ping Li.

It is certified that error appears in the above-indentified patent and that said Letters Patent is hereby corrected as shown below:

Column 5 Line 47 "the" should be deleted before the word "data" therefor.

Column 6 Line 37, "portion" should read --portions-- therefor.

Signed and Sealed this

Twenty-sixth Day of November 1996

Attest:

BRUCE LEHMAN

Attesting Officer     Commissioner of Patents and Trademarks